US007195147B2

(12) United States Patent
Price et al.

(10) Patent No.: US 7,195,147 B2

(45) Date of Patent: Mar. 27, 2007

(54) PORTABLE PROMOTIONAL ASHTRAY

(76) Inventors: Kenneth Neil Price, 205 E. 22 St., Apt. 4, New York, NY (US) 10010; Carmine Russo, 4 Anna Ct., W. Islip, NY (US) 11795

( * ) Notice: Subject to any disclaimer, the term of this patent is extended or adjusted under 35 U.S.C. 154(b) by 238 days.

(21) Appl. No.: 10/916,885

(22) Filed: Aug. 12, 2004

(65) Prior Publication Data

US 2005/0072841 A1 Apr. 7, 2005

Related U.S. Application Data

(60) Provisional application No. 60/508,725, filed on Oct. 3, 2003.

(51) Int. Cl.
*B65G 11/04* (2006.01)

(52) U.S. Cl. ........................................ 232/44; 131/231

(58) Field of Classification Search ................ 131/231; 232/44, 43.1, 1 R; D27/102, 131; 206/136
See application file for complete search history.

(56) References Cited

U.S. PATENT DOCUMENTS

| | | | | | |
|---|---|---|---|---|---|
| 1,554,660 | A | * | 9/1925 | Ruskay | 220/576 |
| 1,912,598 | A | * | 6/1933 | Snadden | 131/237 |
| D205,172 | S | * | 6/1966 | Schetzer | D27/102 |
| 3,507,445 | A | * | 4/1970 | Breslow | 231/1 |
| 3,566,882 | A | * | 3/1971 | Schroeder | 131/234 |
| 3,760,817 | A | * | 9/1973 | Eilertson | 131/235.1 |
| 4,969,478 | A | * | 11/1990 | Keidar et al. | 131/231 |
| 5,004,306 | A | * | 4/1991 | Oshida | 312/319.1 |
| D319,707 | S | * | 9/1991 | Hwang | D27/102 |
| 5,224,499 | A | * | 7/1993 | Zayas | 131/231 |
| 5,927,285 | A | * | 7/1999 | Lozano et al. | 131/231 |
| 6,776,166 | B1 | * | 8/2004 | Mills-Lindsay et al. | 131/231 |
| 6,926,009 | B1 | * | 8/2005 | Woelber et al. | 131/242 |
| 2004/0094547 | A1 | * | 5/2004 | Pandura | 220/8 |
| 2004/0134503 | A1 | * | 7/2004 | Windorfer et al. | 131/231 |

FOREIGN PATENT DOCUMENTS

| | | | |
|---|---|---|---|
| DE | 3533747 | * | 4/1986 |
| FR | 2752679 | * | 3/1998 |

* cited by examiner

*Primary Examiner*—William L. Miller
(74) *Attorney, Agent, or Firm*—Jennifer Meredith, Esq.; Meridith & Keyhani, PLLC

(57) ABSTRACT

A portable promotional ashtray and methods of manufacturing the same. The portable promotional ashtray may have a rectangular outer housing with an upper lip attached to the front portion and having a promotional display a rectangular drawer having a rear portion that is higher than the sides of the rectangular drawer to partially removably contain the rectangular drawer within the rectangular outer housing and containing an extinguishing substance; and a looking mechanism for securing the rectangular drawer when in a closed position. A promotional display may be affixed to the outer housing. As such a portable, disposable ashtray for giveaways at bars, restaurants is provided.

7 Claims, 8 Drawing Sheets

PORTABLE PROMOTIONAL ASHTRAY

BACKGROUND OF THE INVENTION

This application claims priority to Provisional Patent Application No. 60/508,725, filed Oct. 3, 2003, entitled "Portable Promotional Ashtray".

The present invention generally relates to cigarette ashtrays, particularly, small, portable, ashtrays for receiving ash from cigarettes, cigars, or other smoking apparatus, or spent cigarette butts. The present invention is also intended to be disposable, as well as a method for promotions.

When no ashtrays are readily available, cigarette buts are often discarded on the ground. This can be unsanitary, an environmental mess, and a fire hazard if the discarded cigarette or cigar is still lit. Conventional ashtrays are also problematic due to its shallow, open-faced construction; contents of conventional ashtrays are frequently blown around by wind causing unsanitary, unsightly surroundings, and can easily be spilled if inadvertently turned on its side.

Numerous portable ashtrays are known within the art. By way of example U.S. Pat. No. 5,224,499 issued to Zayas discloses a portable ashtray made of flexible heat resistant material that can be folded into a little pouch, with a top that covers the aperture of the receptacle but also doubles as a stand to support the ash tray when set down. The construction of the ashtray especially its aperture cover do not provide an adequate seal that traps both cigarette and cigarette odors. Its size although conveniently portable, when empty, in the wrapper of a cigarette pack, cannot hold a multitude of cigarette butts.

U.S. Pat. No. 4,969,478 issued to Keidar, discloses a pivotally mounted weighted portable ashtray. The ashtray has a top ash receptacle, within a flat-bottomed holder, so as to prevent spills when the ashtray is inadvertently tipped on its side. This ashtray however, doesn't have the ability to be sealed closed thus allowing the user to store spent cigarettes and ash.

U.S. Pat. No. 5,927,285 issued to Lozano et al., discloses a compact ashtray assembly with upper and lower compartments. Insertable into the lower compartment is a removable tray for receiving ash and spent cigarette butts, the upper compartment being a storage chamber for smoker articles. This compact ashtray in its complexity of having multiple compartments is inconvenient in the aspect of a disposable promotional item.

Accordingly, what is needed is a small portable ashtray, which is simple and inexpensive and can be used as a promotional giveaway. This portable ashtray will have a size convenient enough to carry in a pocket while still being able to hold a multitude of discarded cigarettes, and can be properly sealed as to not inadvertently empty it contents.

SUMMARY OF THE INVENTION

The present invention provides a portable ashtray that may safely and securely contains spent cigarettes within ones pocket and may also be used as a promotional give away.

According to the first embodiment of the present invention, a compact, portable ashtray assembly is disclosed, comprising: a rectangular outer housing, having a promotional display; a rectangular drawer partially removably contained within the rectangular outer housing containing an extinguishing substance; and a locking mechanism for securing the removable rectangular drawer when in a closed position.

According to another embodiment of the present invention, a compact, portable ashtray assembly is disclosed, comprising: a cylindrical outer housing having a first aperture along a longitudinal side; a cylindrical inner housing rotatably contained in the cylindrical outer housing having a second aperture along a longitudinal side, wherein the first aperture and the second aperture are in rotating communication as to provide an open position and a closed position, the closed position providing a sealed receptacle.

According to a third embodiment of the present invention, a compact, portable ashtray assembly is disclosed, comprising: a rectangular outer housing; a rectangular drawer partially removably contained within the rectangular outer housing containing an extinguishing substance; and a slide mechanism with a protrusion attached to the rectangular drawer in sliding communication with an opening along a side of the rectangular outer housing.

According to yet another embodiment of the present invention, a method of fabricating of a compact, portable ashtray assembly with a rectangular shape is disclosed, the method comprising the steps of: providing an rectangular outer housing; providing a rectangular drawer wherein the rectangular drawer is smaller than the rectangular outer housing; filling the rectangular drawer with an extinguishing substance; inserting the rectangular drawer into the rectangular outer housing; and affixing a promotional logo on a portion of the compact, promotional ashtray assembly.

According to still yet another aspect of the present invention, a method of fabricating a compact, portable ashtray assembly is disclosed, the method comprising the steps of: providing a cylindrical outer housing; providing a cylindrical inner housing wherein the cylindrical inner housing is rotatably contained within the cylidrical outer housing; providing a first aperture along the longitudinal side of the cylindrical outer housing; providing a second aperture along the longitudinal side of the cylindrical inner housing wherein the first aperture and the second aperture are in rotating communication; filling the cylindrical inner housing with an extinguishing substance; inserting the cylindrical inner housing into the cylindrical outer housing; affixing a promotional logo on a portion of the disposable compact portable ashtray assembly.

This summary is not to be taken in a limiting sense, but is made merely for the purpose of illustrating the general principles of the invention, since the scope of the invention is best defined by the appended claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1A:
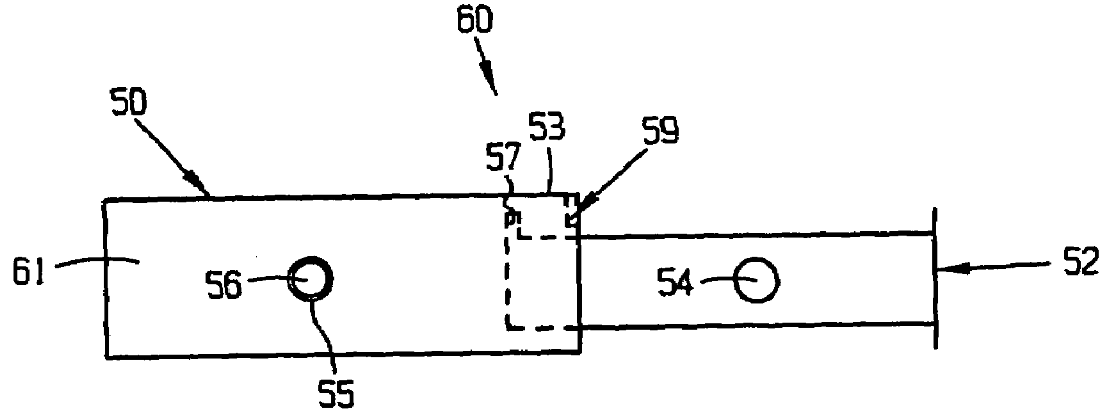
FIG. 1A is a side view of an apparatus according to the present invention.
Figure 1B:
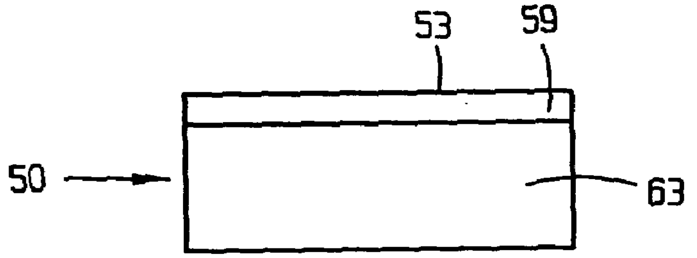
FIG. 1B depicts a front view of an apparatus according to the present invention.
Figure 1C:
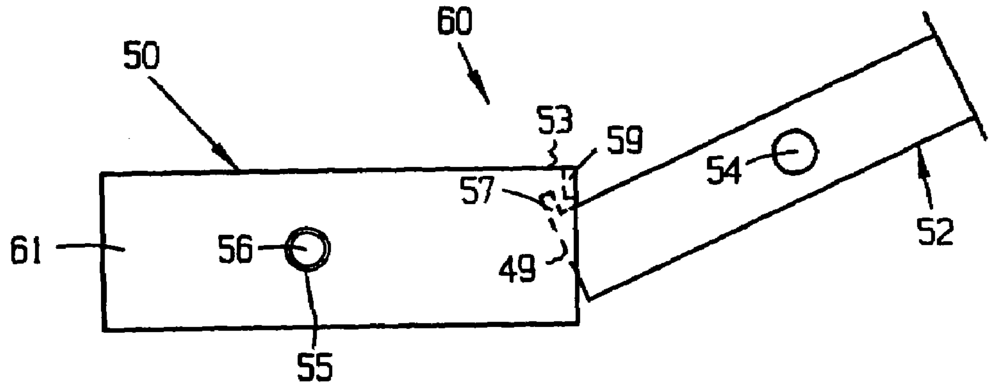
FIG. 1C depicts a side view of an apparatus according to the present invention.
Figure 1D:
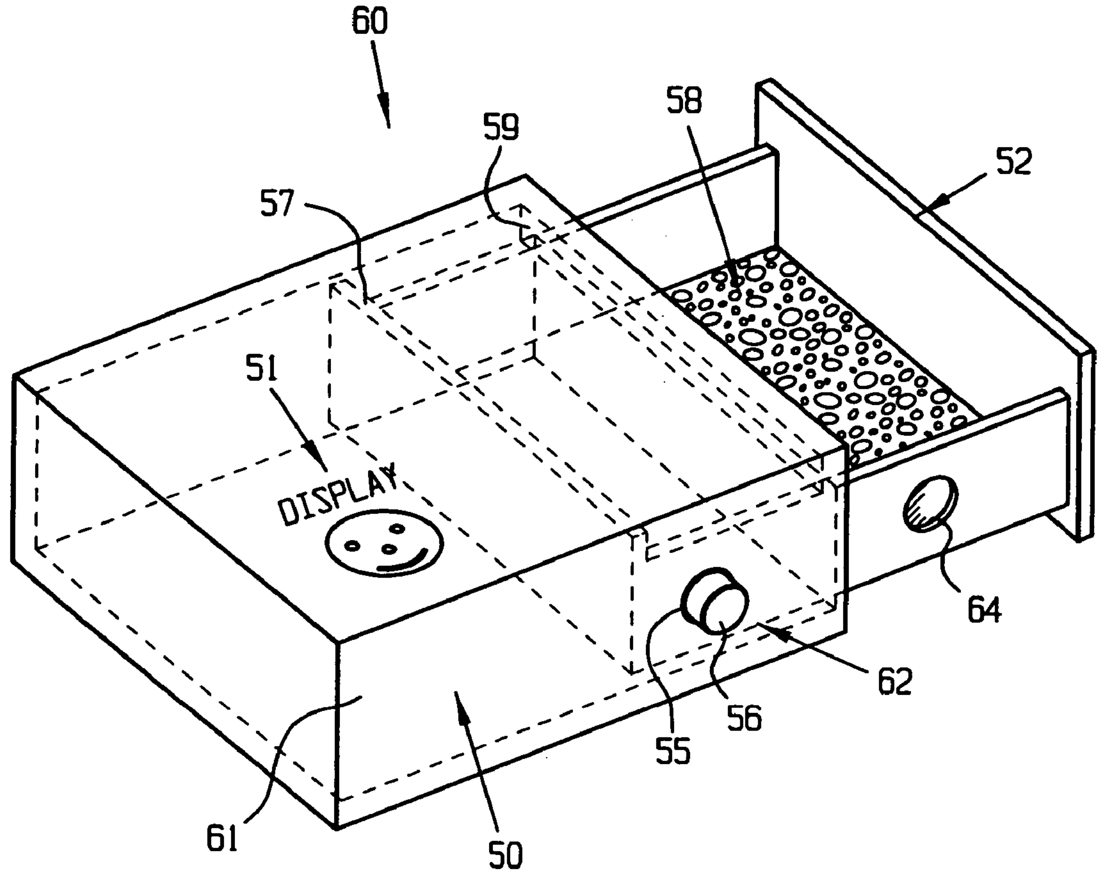
FIG. 1D depicts a perspective view of an apparatus according to the present invention.

FIGS. 1A–1D depict a compact portable ashtray assembly 60 according to the present invention. As shown there is a rectangular outer housing 50 and a slightly smaller rectangular drawer 52. In a preferred embodiment, the rectangular outer housing 50 and the rectangular drawer 52 could be constructed from heat resistant material. The rectangular drawer 52 is partially removably contained within the rectangular outer housing 50, allowing the rectangular drawer 52 to slide in and out of the rectangular outer housing 50. The ashtray assembly 60 can be in a closed position with the locking mechanism 62. In a preferred embodiment, the locking mechanism 62 is comprised of a pin 56 located on the longitudinal side 61 of the rectangular outer housing 50 which can be inserted into a hole like receptacle 54 located on the longitudinal side 61 of the rectangular drawer 52. The rectangular drawer 52 contains an extinguishing substance 58, which could be chosen from the group including sand, gel, air freshener or foam in a preferred embodiment. In a preferred embodiment, a promotional display 51, such as a logo, advertisement, brand name, trademark, or emblem, is affixed to the rectangular outer housing 50 and the rectangular drawer 52. It is envisioned that the open end 61 of the rectangular outer housing 50 has a first lip 59 extending from the top portion 53 of the rectangular outer housing 50 and the rectangular drawer 52 has a second lip 57 on the back portion of the drawer 49. The first lip 59 and second lip 57 prevent the rectangular drawer 52 from sliding out of the rectangular outer housing 50. As shown in FIG. 1C, if the user desires to remove the rectangular drawer 52 he can do so by opening the rectangular drawer 52 at a given angle, thus taking the first lip 59 and the second lip 57 out of communication. By way of example, refills may be sold allowing the rectangular drawer 52 to be discarded, and replaced with a new rectangular drawer 52 containing a fresh extinguishing substance 58.

Figure 2A:
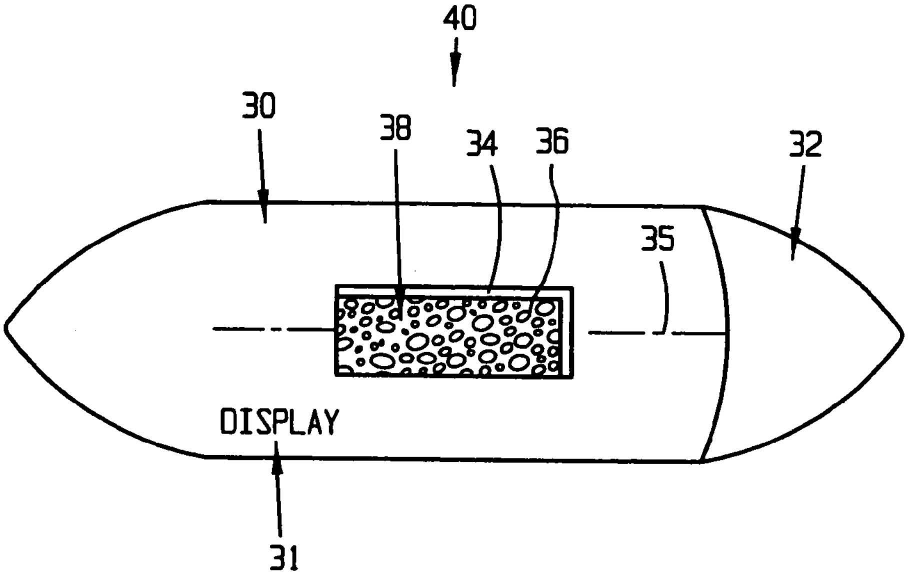
FIG. 2A is a top view of an apparatus according to the present invention.
Figure 2B:
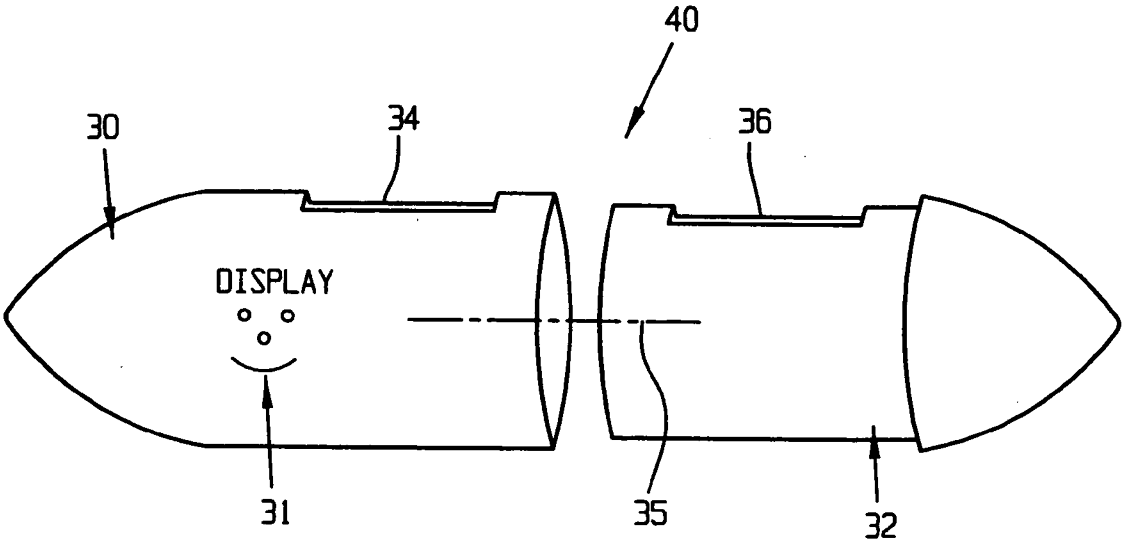
FIG. 2B depicts a side view of an apparatus according to the present invention.

FIGS. 2A and 2B depict a compact, portable ashtray assembly 40 according to another preferred embodiment. As shown, this ashtray assembly 40 consists of a cylindrical outer housing 30 and a cylindrical inner housing 32. In a preferred embodiment, the cylindrical outer housing 30 and the cylindrical inner housing 32 could be constructed from heat resistant material. The cylindrical outer housing 30 has a first aperture 34 along a longitudinal side 35, the cylindrical inner housing 32 which is rotatably contained in the cylindrical outer housing 30 has a second aperture 36 along a longitudinal side 35. The cylindrical outer housing 30 and cylindrical inner housing 32 may be rotated so as to align the first aperture 34 and second aperture 36 in an open position as well as provide a closed position. The cylindrical inner housing 32 may also contain an extinguishing substance 38, which may be any extinguishing substance including sand, gel, air freshener or foam. A promotional display 31, such as a logo, advertisement, brand name, trademark, or emblem may also be is affixed to the cylindrical outer housing. According to a preferred embodiment, the present invention may be used as a giveaway or freebie at a bar. For example, there may be Absolut® Vodka, RedBull® or other advertisers that may hand out such ashtrays with their logo proudly displayed. In this way they are advertising their product and their concern for the cleanliness of the neighborhood.

Figure 3A:
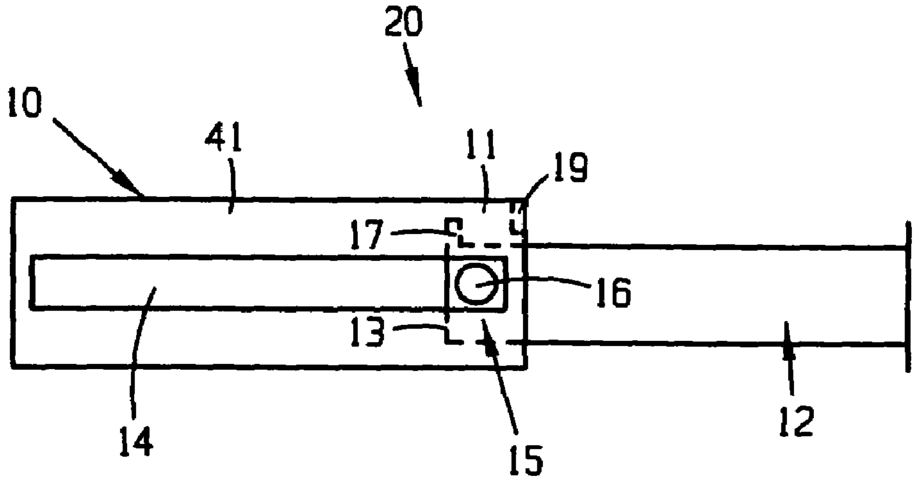
FIG. 3A depicts a side view of an apparatus according to the present invention.
Figure 3B:
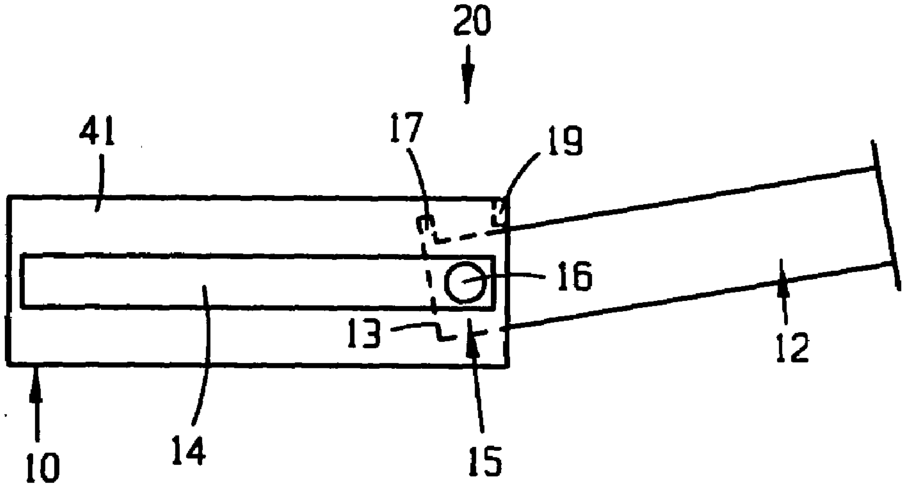
FIG. 3B depicts a front view of an apparatus according to the present invention.
Figure 3C:
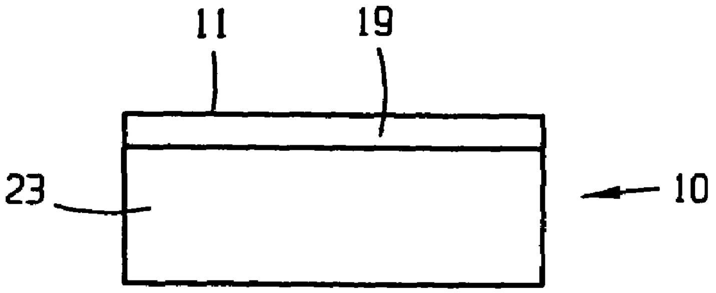
FIG. 3C depicts a front view of an apparatus according to the present invention.
Figure 3D:
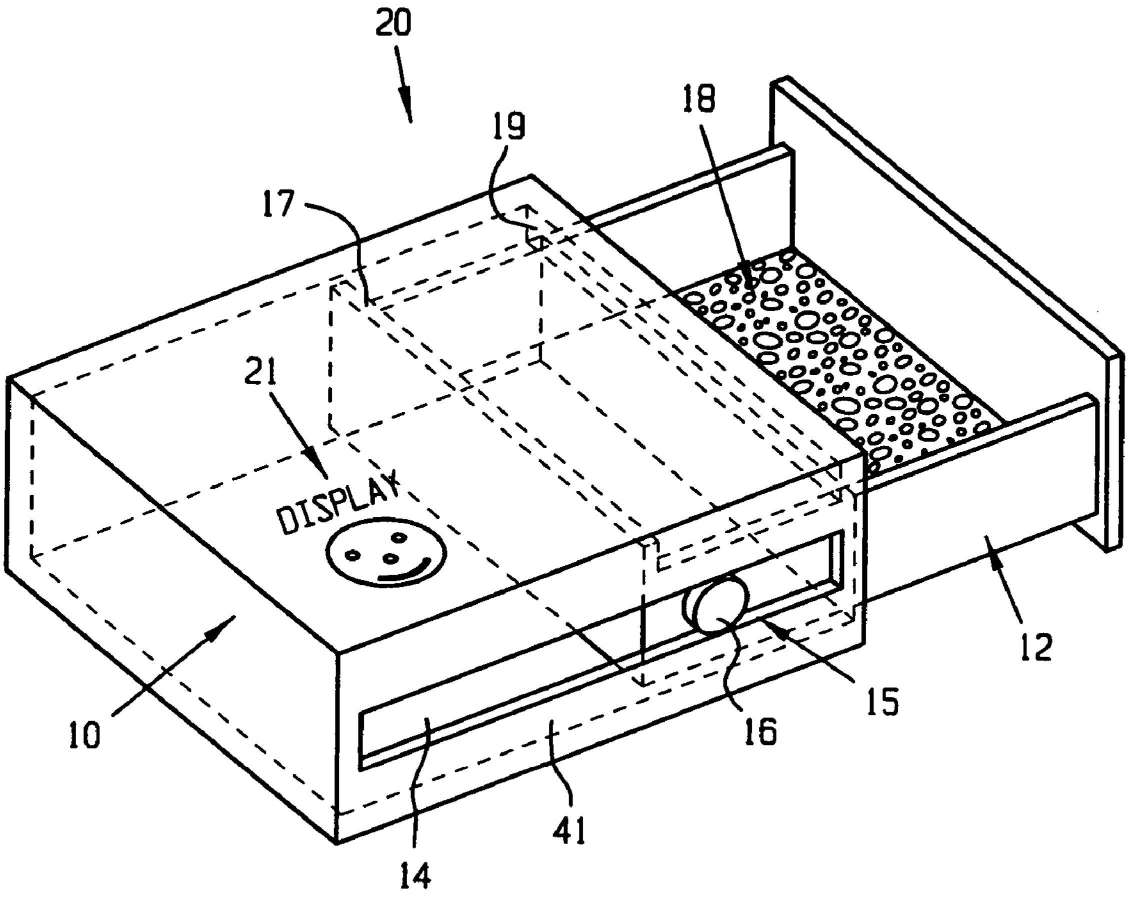
FIG. 3D depicts a perspective view of an apparatus according to the present invention.

FIGS. 3A–3D depict a compact portable ashtray assembly 20 according to the present invention. As shown there is a rectangular outer housing 10, and a slightly smaller rectangular drawer 12. In a preferred embodiment, the rectangular outer housing 10 and the rectangular drawer 12 could be constructed from heat resistant material. The rectangular drawer 12 is partially removably contained within the rectangular outer housing 10, allowing the rectangular drawer 12 to slide in and out of the rectangular outer housing 10. A slide mechanism 15 is located on a longitudinal side 41 as to facilitate opening and closing of the ashtray assembly 20. The slide mechanism 15 is comprised of a guide like rectangular opening 14 along the length of the longitudinal side 41 of the rectangular outer housing 10. Attached to the rectangular inner housing 12 is a protrusion 16, in communication with the rectangular opening 14 of the rectangular outer housing 10. The user can slide the rectangular drawer 12 open and shut by sliding the protrusion 16 back and forth along the guide opening 14. The rectangular drawer 12 contains an extinguishing substance 58, which could be chosen from the group including sand, gel, air freshener or foam in a preferred embodiment. In a preferred embodiment, a promotional display 21, such as a logo, advertisement, brand name, trademark, or emblem, is affixed to the rectangular outer housing 10. It is envisioned that the open end 23 of the rectangular outer housing 10 has a first lip 19 extending from the top portion 11 and the rectangular drawer 12 has a second lip 17 on back portion 13. The first lip 19 and second lip 17 prevent the rectangular drawer 12 from sliding completely out of the rectangular outer housing 10. As shown in FIG. 3B, if the user desires to remove the rectangular drawer 12 he can do so by opening the rectangular drawer 12 at a given angle, thus taking the first lip 19 and the second lip 17 out of communication. By way of example, refills may be sold allowing the rectangular drawer 12 to be discarded, and replaced with a new rectangular drawer 12 containing a fresh extinguishing substance 18.

Figure 4:
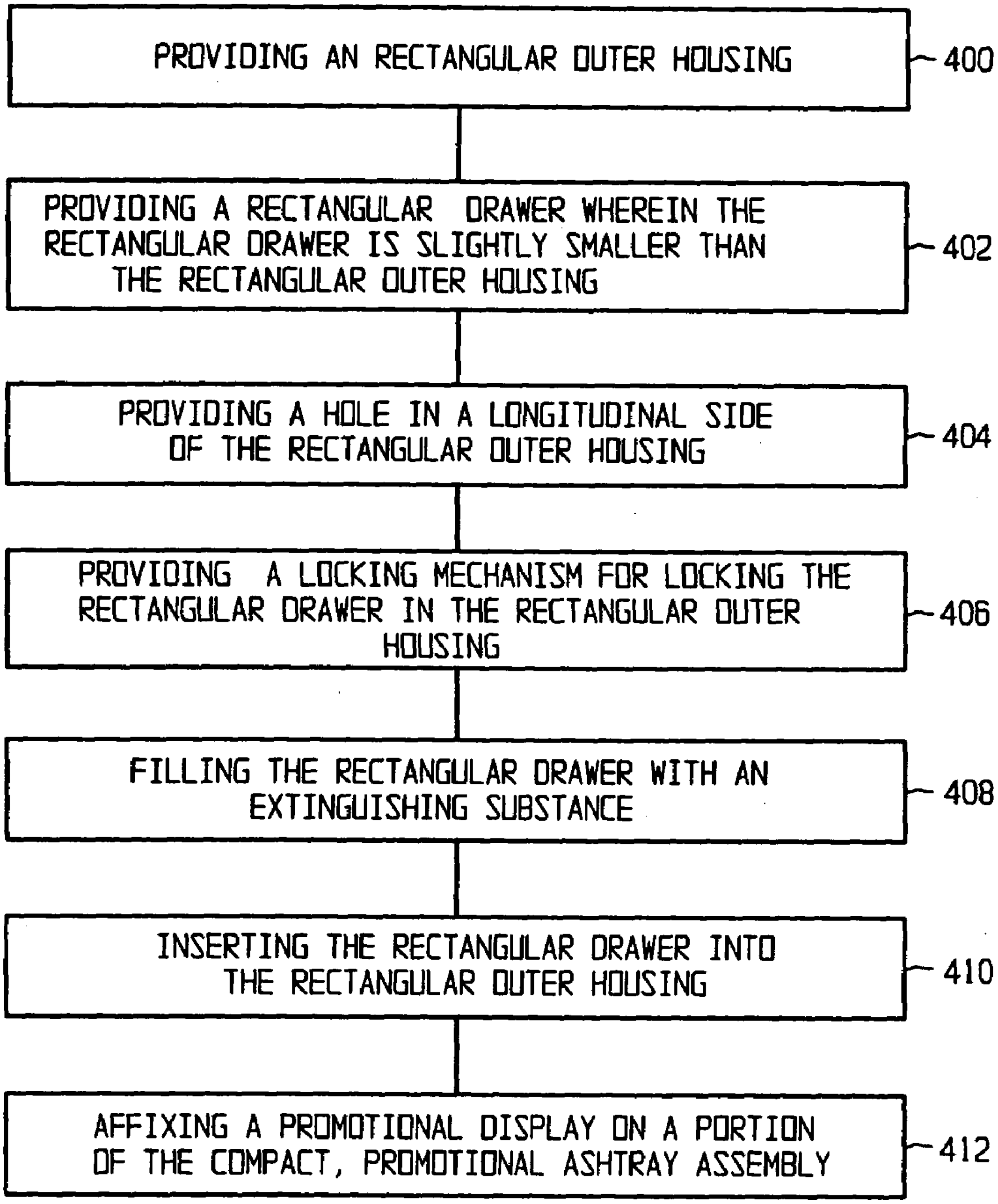
FIG. 4 depicts a flowchart of a method according to the present invention.

FIG. 4 depicts a method of fabricating of a compact, portable ashtray assembly with a rectangular shape 60, the method comprising the steps of: step (400) providing an rectangular outer housing 50. Step (402) is providing a rectangular drawer 52 wherein the rectangular drawer 52 is slightly smaller than the rectangular outer housing 50. Step (404) may be providing a hole 55 in the longitudinal side 61 of the rectangular outer housing 50. Step (406) is providing a locking mechanism 62 for locking the rectangular drawer 52 in the rectangular outer housing 50. In a preferred embodiment, the locking mechanism 52 consists of a pin 56 protruding through a longitudinal side 61 of the rectangular outer housing 50, in communication with a receptacle 54 on the corresponding longitudinal side 61 of the rectangular drawer 52. Step (408) may be filling the rectangular drawer 52 with an extinguishing substance 58, this may be sand, gel, air freshener or foam in a preferred embodiment. Step (410) is inserting the rectangular drawer 52 into the rectangular outer housing 50. Step (412) is affixing a promotional display 51 on a portion of the compact, promotional ashtray assembly 60, which could be a logo, advertisement, brand name, trademark, or emblem, in a preferred embodiment.

Figure 5:
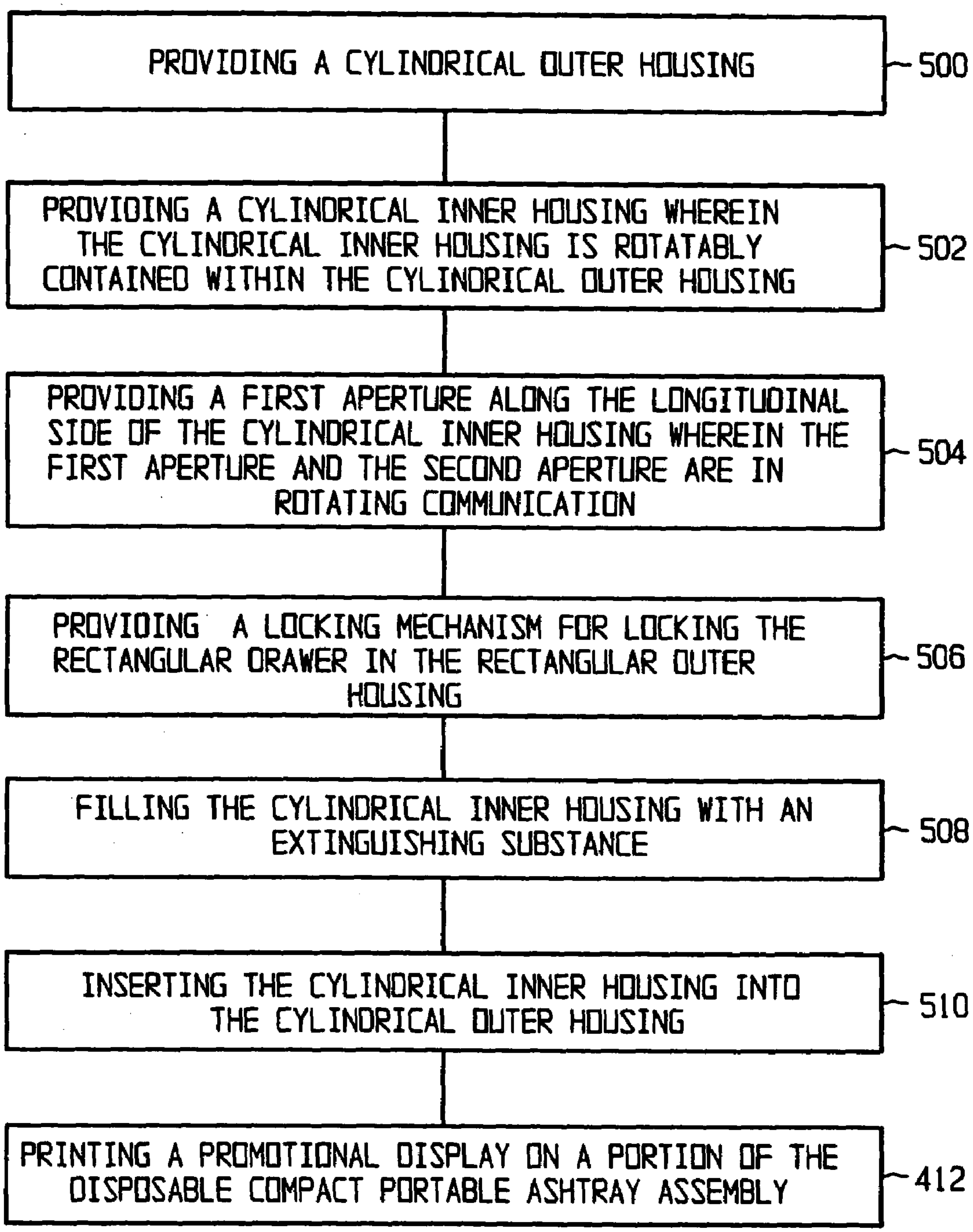
FIG. 5 depicts a flowchart of a method according to the present invention.

FIG. 5 depicts a method of fabricating a compact, portable ashtray assembly with a cylindrical shape 40 comprising the steps of: step (500) providing a cylindrical outer housing 30. Step (502) is providing a cylindrical inner housing 32 wherein the cylindrical inner housing 32 is rotatably contained within the cylindrical outer housing 30. Step (504) is providing a first aperture 34 along the longitudinal side 35 of the cylindrical outer housing 30. Step (506) is providing a second aperture 36 along the longitudinal 35 side of the cylindrical inner housing 32 wherein the first aperture 34 and the second aperture 36 are in rotating communication. Step (508) may be filling the cylindrical inner housing 32 with an extinguishing substance 38, according to a preferred embodiment the extinguishing substance 38 which may be sand, gel, air freshener or foam. Step (510) is inserting the cylindrical inner housing 32 into the cylindrical outer housing 30. Step (512) is printing a promotional display 31 on a portion of the disposable compact portable ashtray assembly 40, such as a logo, advertisement, brand name, trademark, or emblem, is affixed to the cylindrical outer housing.

Figure 6:
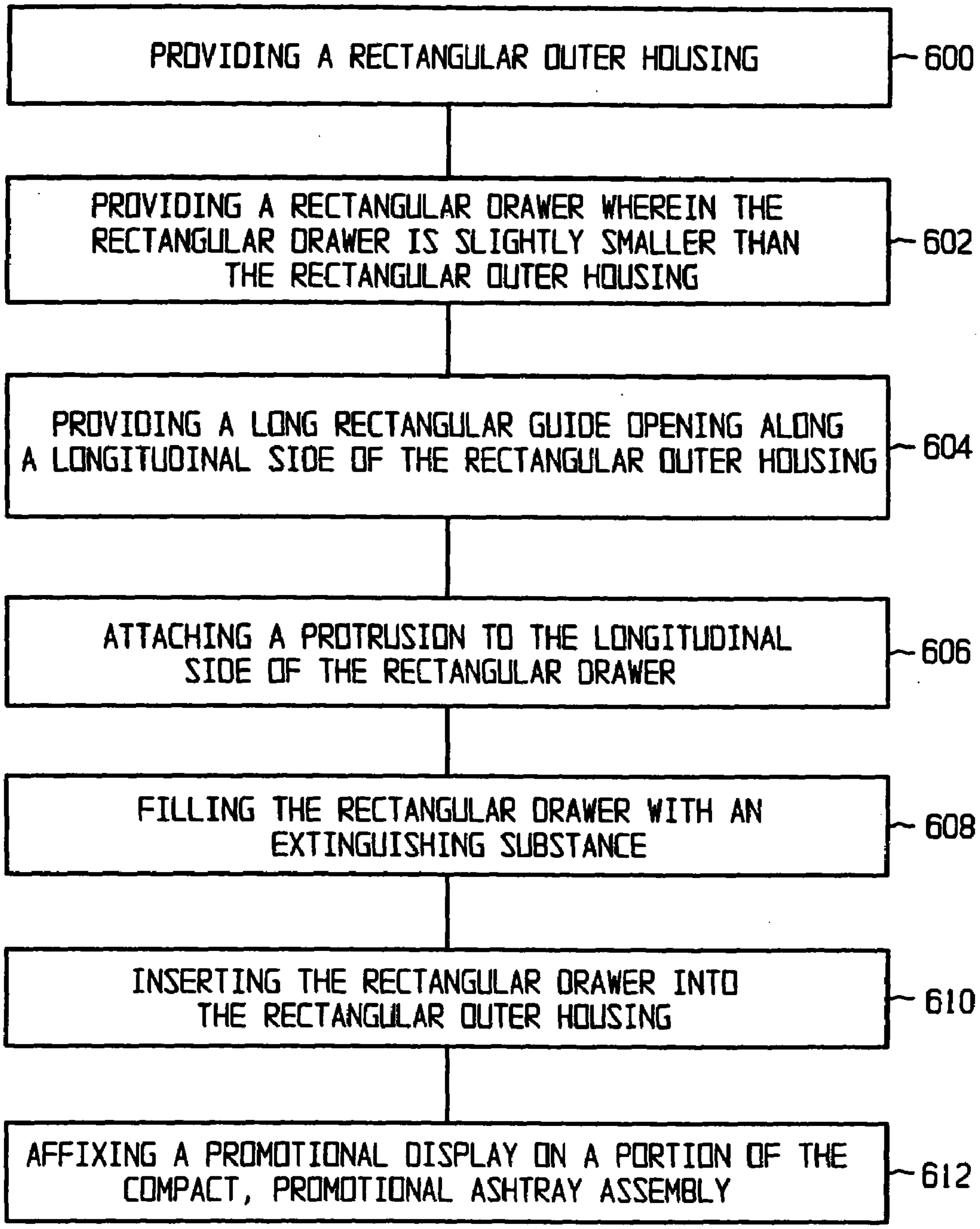
FIG. 6 depicts a flowchart of a method according to the present invention.

FIG. 6 depicts a method of fabricating a compact portable ashtray assembly with a rectangular shape 20 comprising the steps of: step (600) providing an rectangular outer housing 10. Step (602) is providing a rectangular drawer 12 wherein the rectangular drawer 12 is slightly smaller than the rectangular outer housing 10. Step (604) is providing a long rectangular guide opening 14 along a longitudinal side 41 of the rectangular outer housing 10; Step (606) is attaching a protrusion 16 to the longitudinal side 41 of the rectangular drawer 12. This protrusion 16 is in sliding communication with the rectangular guide 14 opening of the rectangular outer housing 10. Step (608) may be filling the rectangular drawer 12 with an extinguishing substance 18, which may be sand, gel, air freshener or foam. Step (610) is inserting the rectangular drawer 12 into the rectangular outer housing 50. Step (612) is affixing a promotional display 21 on a portion of the compact, promotional ashtray assembly 20, which could be a logo, advertisement, brand name, trademark, or emblem, in a preferred embodiment.

We claim:

1. A compact, portable ashtray assembly comprising:

a rectangular outer housing having an open front end and a promotional display, wherein said rectangular outer housing has an upper lip attached to a top portion of said rectangular outer housing at said open front end;

a rectangular drawer having a rear portion that is higher than opposing sides of said rectangular drawer, said rear portion cooperating with said upper lip to partially removably contain said rectangular drawer within said rectangular outer housing, and said rectangular drawer containing an extinguishing substance; and a locking mechanism for securing said rectangular drawer when in a closed position, wherein said locking mechanism consists of a circular opening in one of the sides of said rectangular drawer and a circular pin attached to a side of said rectangular outer housing wherein said circular pin is smaller than said circular opening and is received in said circular opening to temporarily lock said rectangular drawer in said rectangular outer housing in said closed position.

2. The apparatus as in claim 1, wherein said extinguishing substance is selected from the group consisting of sand, gel, air freshener and foam.

3. The apparatus as in claim 1, wherein said rectangular outer housing and said rectangular drawer are made of heat resistant material.

4. The apparatus as in claim 1, wherein said promotional display is affixed to said rectangular outer housing and said rectangular drawer.

5. The apparatus as in claim 1, wherein said promotional display is selected from the group consisting of logo, advertisement, brand name, trademark and emblem.

6. A method of fabricating of a compact, portable ashtray assembly with a rectangular shape, said method comprising the steps of:

providing a rectangular outer housing having an open front end;

attaching an upper lip to a top portion of said rectangular outer housing at said open front end;

providing a rectangular drawer wherein said rectangular drawer is smaller than said rectangular outer housing and has a rear portion that is higher than opposing sides of said rectangular drawer, said rear portion cooperating with said upper lip to partially removably contain said rectangular drawer in said rectangular outer housing providing a locking mechanism for securing said rectangular drawer when in a closed position, wherein said locking mechanism consists of a circular opening in one of the sides of said rectangular drawer and a circular pin attached to a side of said rectangular outer housing wherein said circular pin is smaller than said circular opening and is received in said circular opening to temporarily lock said rectangular drawer in said rectangular outer housing when in said closed position;

filling said rectangular drawer with an extinguishing substance;

inserting said rectangular drawer into said rectangular outer housing; and affixing a promotional logo on a portion of said compact, promotional ashtray assembly.

7. A method as in claim 6, wherein said extinguishing substance is selected from the group consisting of sand, gel, sir freshener and foam.

* * * * *